United States Patent
Ruaudel et al.

(10) Patent No.: US 11,446,759 B2
(45) Date of Patent: Sep. 20, 2022

(54) PULSED LASER METHOD FOR MACHINING A DIAMOND

(71) Applicant: Commissariat A L'Energie Atomique et Aux Energies Alternatives, Paris (FR)

(72) Inventors: Eglantine Ruaudel, Orsay (FR); Gunnar Weck, Rochefort en Yvelines (FR); Thomas Plisson, Bures-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 585 days.

(21) Appl. No.: 16/473,341

(22) PCT Filed: Dec. 21, 2017

(86) PCT No.: PCT/FR2017/053766
§ 371 (c)(1),
(2) Date: Jun. 25, 2019

(87) PCT Pub. No.: WO2018/122503
PCT Pub. Date: Jul. 5, 2018

(65) Prior Publication Data
US 2020/0122268 A1 Apr. 23, 2020

(30) Foreign Application Priority Data

Dec. 28, 2016 (FR) ...................................... 1663479

(51) Int. Cl.
*B23K 26/0622* (2014.01)
*B23K 26/08* (2014.01)
(Continued)

(52) U.S. Cl.
CPC .......... *B23K 26/0624* (2015.10); *B23K 26/08* (2013.01); *B23K 26/361* (2015.10);
(Continued)

(58) Field of Classification Search
None
See application file for complete search history.

(56) References Cited

U.S. PATENT DOCUMENTS 5,057,184 A * 10/1991 Gupta .................. B23K 26/361
216/65
5,938,954 A * 8/1999 Onuma .............. B23K 26/1224
219/121.84
(Continued)

FOREIGN PATENT DOCUMENTS

EP 1535698 A1 6/2005
JP 2008214170 A 9/2008
(Continued)

*Primary Examiner* — Justin C Dodson
(74) *Attorney, Agent, or Firm* — Crowell & Moring LLP

(57) ABSTRACT

A method of machining a diamond includes using a pulsed laser. The diamond is placed in a container containing a transparent liquid. The liquid level is at least 100 microns above a surface of the diamond to be machined, and the transparent liquid can further contain a surfactant additive in an amount of at least 2% and 10% by mass. Next, a laser source is activated such that a laser beam with pulse durations of no longer than one microsecond at a repetition frequency of no more than 5 kHz is applied to the surface to be machined, and relative scanning is performed between the diamond and the laser source, cross-wise to the laser beam and axially in depth, with an amplitude and orientations that are determined by the shape to be machined in the diamond.

17 Claims, 2 Drawing Sheets

(51) Int. Cl.
  *C01B 32/25* (2017.01)
  *B28D 1/22* (2006.01)
  *B23K 26/402* (2014.01)
  *B23K 26/361* (2014.01)
  *B23K 26/38* (2014.01)
  *B23K 103/00* (2006.01)

(52) U.S. Cl.
  CPC ............ *B23K 26/38* (2013.01); *B23K 26/402* (2013.01); *B28D 1/221* (2013.01); *C01B 32/25* (2017.08); *B23K 2103/30* (2018.08)

(56) References Cited

U.S. PATENT DOCUMENTS

| | | | | |
|---|---|---|---|---|
| 7,655,882 B2 * | 2/2010 | Kaplan | ............... | B23K 26/06 219/121.68 |
| 8,319,145 B2 * | 11/2012 | Rosario | ............ | B23K 26/0861 219/121.68 |
| 2002/0149136 A1 * | 10/2002 | Baird | ............... | B23K 26/364 264/400 |
| 2010/0196192 A1 * | 8/2010 | Liu | ............... | B01J 19/121 420/463 |
| 2011/0298156 A1 * | 12/2011 | Hooper | ............... | H01L 24/29 264/400 |
| 2014/0161710 A1 * | 6/2014 | Zousman | ............... | B01J 3/08 422/127 |
| 2015/0165588 A1 * | 6/2015 | Chou | ............... | B24B 53/017 451/56 |
| 2015/0204805 A1 * | 7/2015 | Newton | ............... | G01N 23/223 378/44 |
| 2015/0321287 A1 * | 11/2015 | Mariella, Jr. | ...... | B23K 26/1224 264/0.5 |
| 2016/0214874 A1 * | 7/2016 | Domb | ............... | C02F 1/5236 |

FOREIGN PATENT DOCUMENTS

| | | |
|---|---|---|
| WO | WO 2008/003052 A2 | 1/2008 |
| WO | WO 2015/195754 A1 | 12/2015 |

\* cited by examiner

PULSED LASER METHOD FOR MACHINING A DIAMOND

RELATED APPLICATIONS

This application is a U.S. nationalization of International Application No. PCT/FR2017/053766, filed Dec. 21, 2017 and published as PCT Publication No. WO 2018/122503 on Jul. 5, 2018, the disclosure of which is hereby incorporated by reference.

TECHNICAL FIELD

The invention concerns a method of machining a diamond with a laser making it possible to obtain a smooth and transparent surface.

The invention in particular finds its application in the engineering field of diamonds for physics experiments. Companies such as "Almax Easylab", "Technodiamant" and "Element six" offer diamonds bored with holes, cones or channels for physics experiments.

BACKGROUND

Applications for laser cutting of diamonds concern the production of diamond lenses (diamond lenses are increasingly used, in particular on large synchrotrons), the machining of diamond substrates for optics, electronics or microfluidics, lapidary work (cutting or roughing out of diamonds by laser, polishing diamonds by laser).

However, as explained below, the surfaces obtained are in practice not transparent; nevertheless, obtaining transparent surfaces would open new possibilities for product commercialization.

Conventionally, the cutting of diamonds is carried out mechanically using the natural cleavage planes of diamond; the surface is then polished until sufficiently low roughness is obtained for the diamond to be transparent.

The laser has long been used for ablating, cutting or polishing diamond since this enables considerable time saving and gives freedom in the shape of cutting. Indeed, the lasers usually used may be focused onto very small areas, typically of 1 micron across, and make it possible to ablate the diamond in any particular shape, and not solely along the crystal cleavage planes. However, laser ablation by the current techniques has the major drawback, not only of generating debris, but also of transforming a greater or lesser amount of the machined area into black graphite. Post-treatment, by chemical reaction or mechanical polishing is then still necessary.

Numerous specialists, research groups and industrialists have studied the question of the machining of diamond, and the machining methods presented as having the potential for limiting the appearance of graphite combine two main ingredients:

The use of a laser of which the pulse duration is ultra-short, typically less than 10 ns [see reference 1],
The machining of diamond in a liquid medium, typically water or an organic solvent.

However, the surfaces obtained by laser machining still comprise a greater or lesser amount of graphite. A recent review (2013) of the laser machining of diamond in air [reference 1] (p 423) explains that: "The problem is relatively complicated because, in being laser-ablated, the surface will have a poor degree of smoothness and will be covered by a graphitized layer.".

By performing the machining in water, certain sources mention that "surfaces not affected by heat" or "surfaces without graphite" are obtained. However, when the data are supplied, it is found that a small layer of graphite is still present. The transparency of the surface is moreover never referred to or shown; in various recent studies [references 2-4], of mainly and experimental character and in which the specificity of the diamond is not always properly taken into account, only grooves are channeled and there is no data on the transparency properties of the machined surfaces. Although it may be shown that the volume of graphite created is reduced with machining in water, nothing enables a conclusion of its absence and, especially, that the surface obtained is sufficiently smooth and graphite-free for that surface to be transparent, without any later finishing treatment.

On the other hand, if the documents made available by the companies commercializing laser machined diamonds are examined, one is led to conclude that the surfaces are not sufficiently smooth and/or graphite-free to be transparent. Thus, for example, the company "Synova" offers laser machining in which the laser beam is guided in a water jet; in addition to the fact that the size of the laser beam is inherently too great for micro-machining applications, their marketing brochure states, in relation to the surface quality of samples: "Very smooth side walls with extremely thin black layer that is easily cleaned off.".

Similarly, it was possible to find that the machined diamonds distributed by the company "Almax Easylab", which markets laser machined diamonds for physics experiments, also fail to meet this condition of being sufficiently smooth and graphite-free to be transparent.

However, it would be very useful to have monocrystalline diamonds of which the surfaces have been laser machined such that, without later treatment, they are transparent.

It is to be noted that it is currently possible to obtain, on monocrystalline diamonds, transparent and very smooth surfaces, but using machining techniques without a laser, for example with a beam of focused ions, but such techniques have the drawback of having a high implementation time and a very high cost.

It was mentioned above that it could be necessary to apply a later treatment to remove the graphite after machining, typically by conventional mechanical polishing or by chemical or photochemical reactions, for example involving ozone or laser reactions induced by UV laser [5]. However, such a later treatment has only been successfully used in the case of machining to very small depth (<1 micron). Beyond this, the graphite created during the machining perturbs the machining itself and the shapes obtained present considerable irregularities.

It would thus appear that there is currently no technique of laser machining for diamonds, to a significant depth (greater than 1, or possibly greater than 5 microns), making it possible to obtain machined surfaces, preferably without additional treatment, which, while having the correct dimensions, are sufficiently smooth and graphite-free to be transparent.

SUMMARY

The invention provides a method of direct deep cutting of a diamond with a laser leaving a surface which is transparent to visible light without post-treatment.

To that end, the invention provides a method of machining a diamond by means of a pulsed laser comprising:

placing the diamond in a receptacle containing a transparent liquid of which the level is located at least 100 microns above a surface of the diamond which is to be machined, activating a laser source so as to apply to the surface to machine a laser beam having pulses of duration at most equal to one microsecond at a repetition frequency of at most 5 kHz, actuating relative scanning between the diamond and the laser source, transversely to the laser beam and axially depthwise, with an amplitude and orientations that are determined by the shape of the machining to perform on the diamond.

The method is based on several features. In accordance with the teachings of the state of the art commented upon above, it combines the use of an ultra-short laser (that is to say with ultra-short pulses) with the presence of a liquid in which the machining (or ablation) is carried out.

However, the method involves conditions as to the repetition frequency of the ultra-short pulses, advantageously combined with conditions as to the liquid in which the diamond to machine is immersed.

More specifically, the frequency of the laser pulses must be less than in the state of the art, whereas it could be thought on the contrary that, to have a very smooth surface, a high repetition frequency would be necessary to obtain machining as continuous as possible at a given rate of movement.

Furthermore, it became apparent that the presence of a surfactant in the liquid had, surprisingly, a favorable effect on the surface quality obtained, even leading to transparency.

The invention is based on the adjustment of the repetition frequency of the laser, that is to say the temporal spacing of the successive pulses which remove material, favorably complemented by the introduction of a surfactant. This repetition frequency must be less than a few kiloHertz (typically less than 5 kHz, or possibly less than 2 kHz) and ideally less than 1 kiloHertz, or possibly 500 Hz. This constitutes leaving a time between two successive pulses which is at least equal to the order of a millisecond (or even several milliseconds).

The polarization of the laser is chosen to be circular, or failing that, elliptical but as close as possible to circular polarization.

The introduction of the surfactant improves the quality of the result obtained in that it reduces the meniscus present at the surface of the liquid and makes the machined surface smoother. The presence of the surfactant also makes it possible to maintain the quality of the machining at higher repetition frequencies of the laser, beyond 500 Hertz, and to attain frequencies of a few kiloHertz (typically 5 kiloHertz), while maintaining the transparency properties of the machined surface.

According to advantageous features of the invention:
- the liquid (typically pure and/or demineralized water, or an aqueous solution, in particular) contains a surfactant additive; it may in particular be a surfactant additive of polyoxyethylene type.
- the liquid furthermore contains a mineral salt in an amount at most equal to 10% by mass; it may in particular be sodium chloride.
- the liquid is made to move by mechanical stirring.
- the level of the liquid above the surface to machine is at least equal to 100 microns (preferably 200 microns) and at most equal to three millimeters (preferably one millimeter).
- the pulse duration is comprised between 100 femtoseconds and 100 picoseconds, preferably at most equal to 1 picosecond, or even 500 femtoseconds, for a repetition frequency comprised between 100 Hz and 1 kHz, or even 200 and 800 Hz.
- the wavelength of the laser beam is comprised between 500 and 530 nm.
- the polarization of the laser is circular.
- the scanning is actuated with a step size at most equal to 10 microns, or even 1 micron, transversely to the beam and axially between two transverse scanning cycles.
- the machining is carried out to the depth of at least 10 microns, in one or more cycles.
- the focusing objective is an immersion objective submerged directly in the liquid used.

BRIEF DESCRIPTION OF THE DRAWING

Objects, features and advantages of the invention are apparent from the following description, given by way of illustrative non-limiting example with reference to the accompanying drawings in which.

DETAIL DESCRIPTION

Figure 1:
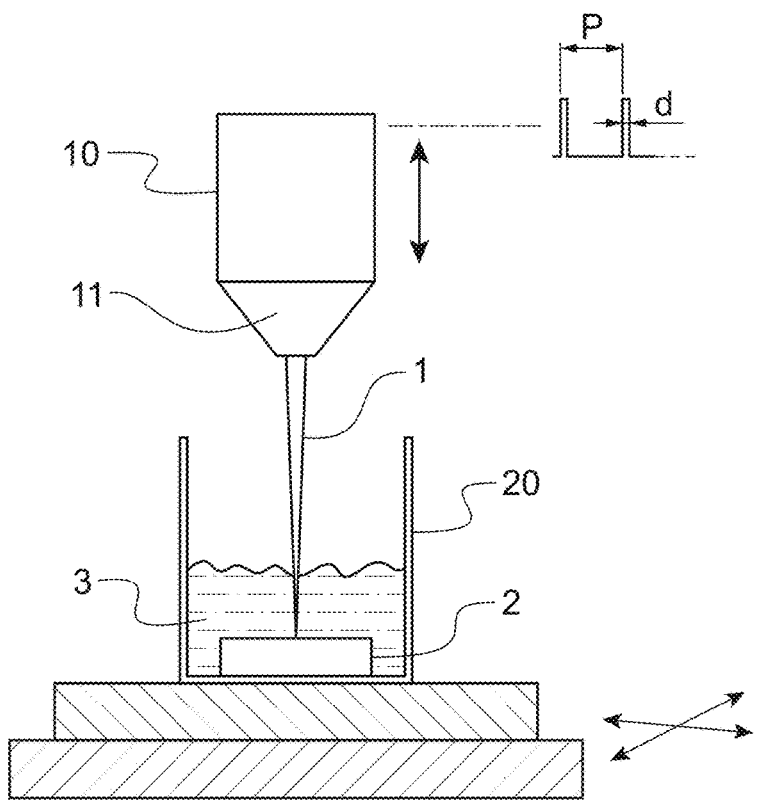
FIG. 1 is a synoptic diagram of a device for implementing the invention.

As is shown diagrammatically in FIG. 1, the method of the invention comprises the implementation of a pulse type laser source 10, having circular polarization or elliptical polarization close to circular polarization, emitting micropulses of durations d at most equal to the microsecond, preferably at most equal to 500 picoseconds (or possibly less than 100 picoseconds, or possibly less than the picosecond), at a repetition frequency of at most 5 kilohertz, preferably at most equal to 1 kilohertz.

This laser source is connected to a focusing objective 11 making it possible to adjust the concentration of the laser beam 1 on a sample denoted 2. In the example represented, the focusing optic is an objective operating in air; as a variant not shown, it may be an "immersion" objective, that is to say designed to be directly immersed in the liquid (in which case the beam coming from this objective propagates entirely in the liquid).

This sample 2 is placed in a container 20, containing a transparent liquid 3 in which the sample is immersed and located facing the focusing optic. In practice, the position in terms of height of this optic is adjustable in height relative to the sample (that is to say that the position of one and/or the other is adjustable relative to the other), which is shown diagrammatically by a double vertical arrow in FIG. 1. This adjustment makes it possible to concentrate the laser beam on the surface to machine of the sample.

The sample 2 is a monocrystalline or polycrystalline diamond (for example nano-crystalline), which is natural or synthetic, which is advantageously fastened to a mounting, here constituted by the bottom of the container, for example by bonding.

If the objective used is an immersion objective, the level of liquid above the sample is at least equal to the distance between the objective and the surface of the sample when the latter is at the focal point of the objective, that is to say when the laser is focused by the objective on the surface of the sample.

If the objective used operates in air, the level of liquid used must be adapted according to the container, the focusing distance of the objective and the duration of the machining. The level of liquid must typically be greater than 100 microns, preferably at least 200 microns. The level of liquid not to be exceeded is determined by the appearance of movements of the surface of the liquid (formation of small waves, typically, which will be detrimental to the machining quality). It was possible to use heights of liquid of several millimeters (typically 3 mm) in suitable receptacles, for example a small cup in which was placed a piece of metal to break up the formation of waves. A still higher limit is the distance to the objective which musst of course not be exceeded if it is not an immersion objective. Such a distance may thus, in particular, be chosen between 100 microns and 3 mm, for example between 200 microns and of the order of one millimeter.

In practice, the wavelength is advantageously chosen according to the liquid used so as to minimize its absorption by that liquid before reaching the surface to machine.

The power of the laser used is chosen such that the fluence of the beam exceeds the ablation threshold of diamond in the liquid (in the case of water, typically 5 Joules per square centimeter); in practice a fluence of 80 joules per square centimeter gives very good results (to the nearest 5 to 10 $J/cm^2$).

This transparent liquid typically substantially consists of water, in practice demineralized water.

However, as a variant, this transparent liquid may also be an aqueous solution containing an acid or a base, for example potassium hydroxide in aqueous solution, or for instance oxygenated water, or even transparent hydrocarbons.

This transparent liquid advantageously has surfactant properties; it is thus advantageously water containing a surfactant additive. These surfactant properties have proved to improve the machining conditions, and make it possible in particular to substantially increase the repetition frequency of the laser (typically from 500 to 5 kHz) while maintaining the transparency of the machined surface (without deposit of graphite).

It may thus be an additive of the kind having chains of ethylene oxide (that is to say a polyoxyethylene).

It is for example the additive $C_{14}H_{22}O(C_2H_4)n$ such as that sold by Dow Chemical Company under the trademark "Triton X-100 ©" such a non-ionic surfactant additive has the advantage of being transparent, colorless and non-foaming.

However, the advantages of a surfactant effect have also been observed with a few drops of an ordinary washing-up liquid such as that commercialized under the trademark "Paic ©", thus showing that all types of surfactant (non-ionic such as "Triton X-100 ©" or substantially anionic such as "Paic ©") produce the effect sought on the laser machining of diamond.

However, the surfactant additive chosen is advantageously selected by its properties of transparency, and its absence of foaming power, in order to disturb the passage of the laser in the liquid as little as possible. It is present in an amount sufficient for the detergent effect to be obtained without however exceeding a threshold which would reduce the transparency of the liquid which is typically the case with concentrations comprised between 0.05 and 0.2% by volume for "Triton X-100 ©".

Stirring of the liquid (preferably moderate so as not to create significant surface movements) proved to have a beneficial effect on the machining, in the same sense as that of the introduction of the surfactant, i.e. improving the machining process, making it possible to increase the repetition frequency of the laser pulses for a same machining quality.

The presence of a mineral salt, such as sodium chloride, also proved to have a beneficial effect on the elimination of any graphite deposit and on the possible depth of machining and on minimizing the roughness of the machined surface.

Such a salt may be present in an amount up to 10%, preferably comprised between 3 and 7% by mass;

The machining of the diamond in practice consists in performing relative scanning between the laser source and the sample, the size of the impact of the laser beam on the sample being substantially less than the size of the region to bore; by way of non-limiting examples, if the region to machine has a typical size of 100 microns (this is for example the length of one side of a polygon, or a maximum dimension, in particular), it will be possible to use a beam focused on 1 square micron; if the region has a characteristic size of one millimeter, the beam may be focused on 10 square microns only. The amplitude and the orientations of the scanning define the geometry of the machined region.

The energy of the beam and the scanning speed define the depth which can be bored on each scanning cycle; this depth is typically of the order of 1 to 10 microns, or at least greater than 0.1 micron.

The scanning may be obtaining by moving the focusing optic relative to the sample or by moving the sample under the focusing optic (or the combination of these movements); this is shown diagrammatically by the crossed horizontal double arrows, represented close to the receptacle mounting. These movements are for example carried out using translation stages for moving the sample and/or by galvanometric heads for moving the laser beam relative to the sample.

It should be noted that the concept of repetition frequency is to be defined locally, in relation to the successive machining of adjacent regions; thus the scanning may be made in parallel with two distinct paths, in locations that are for example separated by a distance equal to at least about ten times the size of the machining beam (for example two parallel paths or according to two portions of a same path), by taking advantage of the possibility of rapidly changing the orientation of the beam by an appropriate command of the galvanometric heads.

Figure 2:
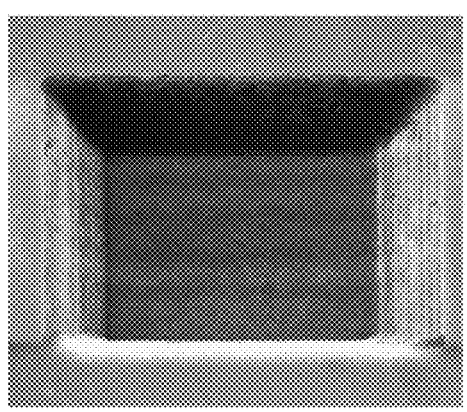
FIG. 2 is a view by scanning electron microscope of a transparent pit machined in a diamond in accordance with the method of the invention.

FIG. 2 shows the result of machining a pit in a diamond; the walls have striations which seem that they must be attributed to the successive scanning cycles. By contrast, the bottom appears very smooth, without the slightest striation detectable at this enlargement (in the example considered, the pit is a few tens of microns across).

A visual examination of this pit furthermore enabled it to be noted that the machined surface is transparent when it is illuminated with light passing through which tends to confirm the very smooth character of the bottom of the pit but also the absence of any deposit of graphite at the time of the machining.

The quality of the result is characterized by FIGS. 3 to 6.

Figure 3:
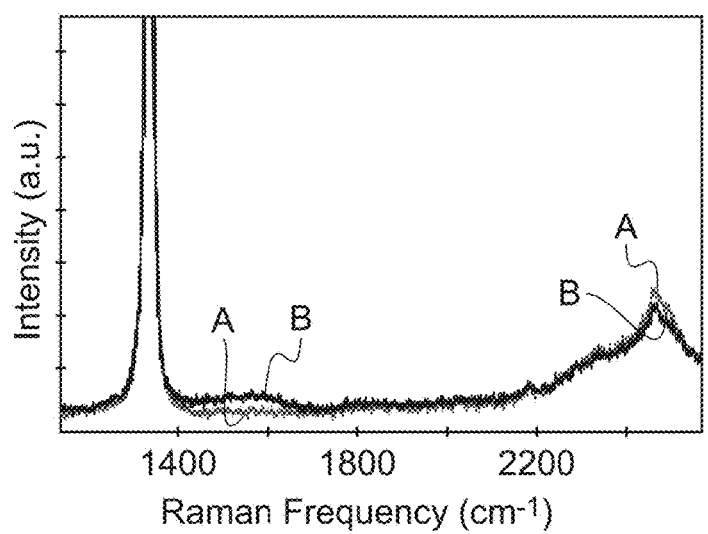
FIG. 3 is a graph showing Raman spectra obtained on a surface of a diamond that has not been machined and at the bottom of a pit in accordance with FIG. 2.

Thus, FIG. 3 represents a Ramon spectroscopy spectrum of the surface for which the characteristic signal of graphite is absent. The gray curve (denoted A) is the Raman spectrum of natural diamond before laser cutting, that in black (denoted B) is the spectrum of the diamond at the location of the bottom of the pit bored with the laser to a depth of 20 micrometers. The bump around 1600 cm$^{-1}$ was attributed to the local presence of nanocrystalline diamond [6]. There is thus no graphite formed in the machining according to the method of the invention.

Figure 4:
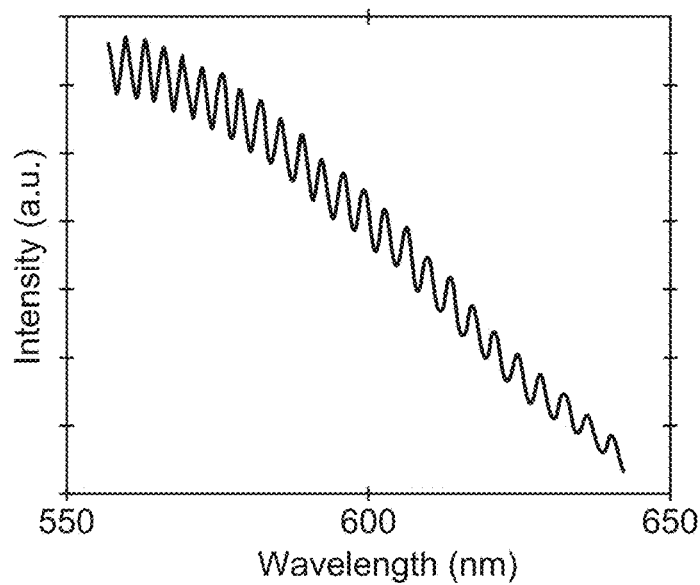
FIG. 4 is an interference graph obtained with white light between the bottom of such a pit and a surface of the diamond that has not been machined.

The transparency of the bottom surface of the pit may be confirmed by FIG. 4 which shows an interference spectrum with white light taken between the surface of an unmachined reference diamond and a surface machined with our method; the possibility of observing interference fringes shows the transparency of the surface of the bottom of the pit, but also its perfect flatness. The transparency of the surface machined according to the method of the invention is thus such that it enables spectral studies to be carried out by passing a laser through the pit.

Figure 5:
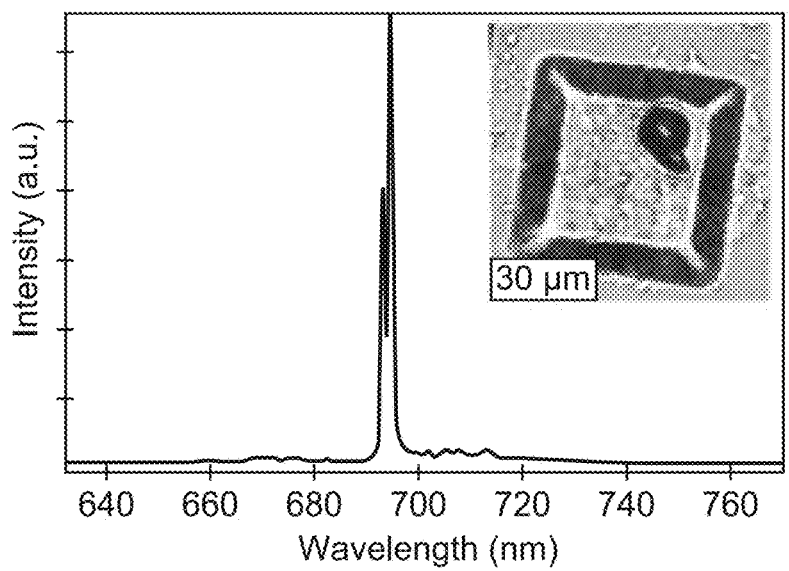
FIG. 5 is a spectroscopy signal recorded for a sample placed in such a pit.

This transparency is confirmed by FIG. 5 which is a spectroscopy curve obtained for a foreign body observed through a surface machined with a laser in accordance with the invention. More specifically, the machined surface is a small pit like that of FIG. 2. A ruby is placed in that pit. The spectroscopy signal presented was obtained through the diamond, that is to say that the exciting laser as well as the signal emitted by the ruby passed through the machined surface (from the back of the sample in FIG. 2, and towards the back of that sample, respectively). It is found that the transparency properties of the machining make it possible to obtain a spectroscopy signal through the machined surface.

Figure 6:
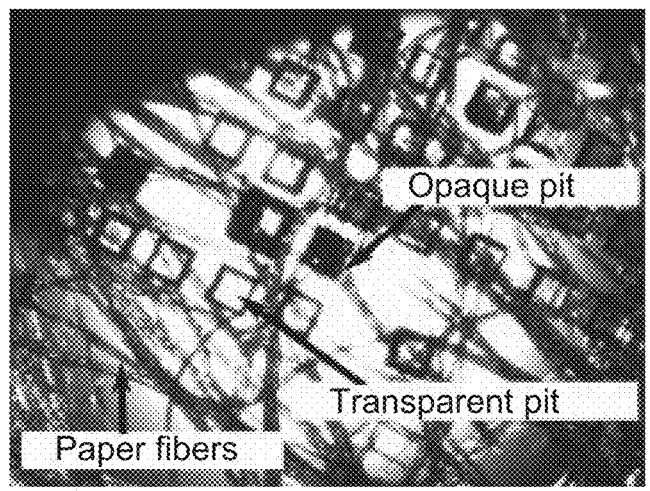
FIG. 6 is an optical image of paper fibers placed under a diamond in which multiple pits have been machined, that were obtained conventionally (opaque) or in accordance with the invention (transparent).

The photograph of FIG. 6 shows a monocrystalline diamond in which various pits have been machined and under which have been disposed paper fibers: it is possible to distinguish pits machined with a conventional method, here by laser but in the air, that is to say without liquid (they appear as being dark, not making it possible to see anything through the underlying portion of the diamond) and transparent pits, enabling the underlying paper fibers to be seen, all obtained by the method of the invention.

It is thus confirmed that the method of the invention makes it possible to obtain a transparent machined surface free of black graphite. The surface is also sufficiently smooth to enable an object to be observed through a very small pit obtained using this method. It is also possible to perform spectroscopy measurements (laser, or by absorption of white or infrared light, in particular) through the surface, and even conduct interference experiments.

It is important to note that, by avoiding having to carry out chemical or mechanical post-treatment after the machining, the method makes it possible to diversify the geometries it is possible to machine with the speed of the laser. In particular the invention makes it possible to machine concave shapes with the laser, such as the pits described above while obtaining the characteristics of cleanliness and geometry which ensure that the machined surfaces are transparent. It can easily be understood that, if a graphite deposit were to be formed in a pit such as that of FIG. 2, a later treatment aimed at eliminating it would be difficult to perform, and would quite certainly have altered the machining dimensions.

By way of example, the invention has been implemented with the following operating conditions which made it possible to obtain pits as described above and presented in FIG. 6:

Laser of the trademark "Amplitude systemes" and the model "SATSUMA" delivering pulses of 300 femtoseconds, of wavelength 515 nm, and used an energy per pulse of 5 micro-Joules, with a repetition frequency of 500 Hertz and circular polarization.

Focusing objective: objective with ×10 of the trademark "Thorlabs", with a numerical aperture of 0.25.

Horizontal scanning of the sample by rows spaced by 0.8 micrometers and vertical descent by steps of 0.5 micrometers driven by translation stages of the trademark "Jenny-Science", the machining system as a whole having been integrated and interfaced by the company "OPTEC".

Liquid used: a solution based on 4 mL of demineralized water, 0.2 grams of sodium chloride and 0.1 milliliter of Triton×100 (surfactant agent) diluted to 5% in the demineralized water; a height of liquid of approximately 0.7 mm in a receptacle of 2 cm diameter.

It is understood that, these conditions having led to optimal machining, it is within the capability of the person skilled in the art to take inspiration to derive another optimal compromise therefrom, by modifying one or other of the parameters.

Thus, in particular, it is possible advantageously to:
vary the duration of the pulses between 100 femtoseconds and several tens of picoseconds, for a repetition frequency comprised between 200 Hz and 1 kHz,
choose a wavelength from near infrared to near UV,
modify the scanning step size; it can be understood that, the more the beam is focused on a small area, the smaller the step size it is possible to choose, for example of the order of half the diameter of that beam,
use an immersion objective submerged directly in the machining liquid.

The method is particularly applicable for machining diamonds to a cumulative depth of at least about ten microns.

The examples described above concern monocrystalline diamonds. As a variant the method may be implemented with polycrystalline diamonds, for example nanocrystalline diamonds (it is to be noted that, in such a case, which is important from a practical point of view, mechanical polishing is ineffective); no difference was found between natural diamonds and synthetic diamonds.

BIBLIOGRAPHICAL REFERENCES

"Optical engineering of diamond", R. P. Mildren and J. R. Rabeau, Wiley-CH, (Chapter 12: *Laser micro- and nano-processing of diamond materials*), (2013).

[2] "Laser processing of diamonds and sintered c-BN in liquid", H. Miyazawa and M. Murakawa, *New diamond and frontier technology,* 10, 3200 (2001).

[3] "Laser-assisted etching of diamonds in air and in liquid media", G. A. Shafeev, E. D. Obraztsova and S. M. Pimenov *Mater. Sci. Eng. B-Solid State Mater. Adv. Technol.* 46, 129-132 (1997).

[4] "Underwater and water-assisted laser processing: Part 2—Etching, cutting and rarely used methods", A. Kruusing, *Optics and lasers Engineering,* 41, 333 (2004)

"Laser patterning of diamond part II surface nondiamond carbon formation and its removal", Smedley et al, *Journal of applied Physics,* 105, 123108 (2009).

[6] "Detecting sp² phase on diamond surfaces by atomic force microscopy phase imaging and its effect on surface conductivity", Kozak et al, *Diamond & related materials*, 18, 722-725, (2009).

The invention claimed is:

1. A method of machining a diamond by means of a pulsed laser comprising:
    placing the diamond in a receptacle containing a transparent liquid having a liquid level at least 100 microns above a surface of the diamond, the transparent liquid containing a surfactant additive;
    activating a laser source and applying a laser beam having pulses of duration at most equal to one microsecond at a repetition frequency of at most 5 kHz to the surface of the diamond, the laser beam having a wavelength selected to minimize absorption by the transparent liquid before reaching the surface of the diamond, a power selected to exceed an ablation threshold of the diamond in the transparent liquid, and a polarization ranging from elliptical to circular,
    actuating relative scanning between the diamond and the laser source, transversely to the laser beam and axially depthwise, with an amplitude and orientations that are determined by a shape of the machining of the diamond, thereby obtaining a transparent machined surface free of black graphite,
    wherein the surfactant additive exhibits transparency and an absence of foaming power so as to minimally disturb a passage of the laser beam in the transparent liquid, the surfactant additive being present in an amount sufficient for a detergent effect to be obtained without exceeding a threshold where the transparency is reduced.

2. The method according to claim 1, wherein the surfactant additive is polyoxyethylene.

3. The method according to claim 1, wherein the transparent liquid further contains a mineral salt in an amount at most equal to 10% by mass.

4. The method according to claim 3, wherein the mineral salt is sodium chloride.

5. The method according to claim 1, wherein the transparent liquid is made to move by mechanical stirring.

6. The method according to claim 1, wherein the liquid level above the surface of the diamond is at least equal to 100 microns and at most equal to three millimeters.

7. The method according to claim 1, wherein the pulse duration is between 100 femtoseconds and 100 picoseconds for a repetition frequency comprised between 100 and 1000 Hz.

8. The method according to claim 1, wherein the wavelength of the laser beam is between 500 and 530 nm.

9. The method according to claim 1, wherein the relative scanning is actuated with a step size at most equal to 10 microns, transversely to the beam and axially between two transverse scanning cycles.

10. The method according to claim 1, wherein polarization of the laser is circular.

11. The method according to claim 1, wherein the machining is carried out to a depth of at least 10 microns, in one or more cycles.

12. The method according to claim 1, wherein focusing objective of the laser is an immersion objective submerged directly in the transparent liquid.

13. The method of claim 1, wherein the amount of the surfactant additive is between 0.05 and 0.2% by volume.

14. The method of claim 1, wherein the power of the laser beam is at least 5 J/cm².

15. The method of claim 1, wherein the amount of the surfactant additive is between 0.05 and 0.2% by volume, and
    wherein the surfactant additive comprises polyoxyethylene.

16. The method of claim 1, wherein the wavelength of the laser beam is between 500 and 530 nm, and
    wherein the power of the laser beam is at least 5 J/cm².

17. The method of claim 1, wherein the amount of the surfactant additive is between 0.05 and 0.2% by volume,
    wherein the surfactant additive comprises polyoxyethylene,
    wherein the wavelength of the laser beam is between 500 and 530 nm, and
    wherein the power of the laser beam is at least 5 J/cm².

* * * * *